United States Patent [19]

Kubo et al.

[11] Patent Number: 5,310,833

[45] Date of Patent: * May 10, 1994

[54] PROCESS FOR FEEDING CATALYST TO FLUIDIZED BED FOR VAPOR PHASE POLYMERIZATION

[75] Inventors: Kunimichi Kubo, Meguro; Motokazu Watanabe; Mamoru Yoshikawa, both of Kawasaki; Masatoshi Morikawa, Setagaya; Yoshihisa Yamaguchi, Kawasaki, all of Japan

[73] Assignee: Nippon Petrochemicals Company, Ltd., Tokyo, Japan

[*] Notice: The portion of the term of this patent subsequent to Apr. 13, 2010 has been disclaimed.

[21] Appl. No.: 20,758

[22] Filed: Feb. 22, 1993

Related U.S. Application Data

[63] Continuation of Ser. No. 842,094, Mar. 19, 1992, Pat. No. 5,202,396.

[30] Foreign Application Priority Data

Jul. 20, 1990 [JP] Japan ................... 2-192424

[51] Int. Cl.$^5$ ............................................. C08F 2/34
[52] U.S. Cl. ...................... 526/88; 526/901; 422/131; 422/145
[58] Field of Search ................... 526/88; 422/131, 145, 422/213, 214

[56] References Cited

U.S. PATENT DOCUMENTS 4,687,381 8/1987 Dumain et al. ................... 406/52

Primary Examiner—Joseph L. Schofer
Assistant Examiner—David Wu
Attorney, Agent, or Firm—Yahwak & Associates

[57] ABSTRACT

A process for feeding a powder catalyst with a gas intermittently to a high-pressure fluidized bed reactor for the vapor phase polymerization of olefin, wherein the cross section of a catalyst feed pipe is reduced midway through the pipe to thereby make continual catalyst feeding possible and prevent the formation of a lump polymer.

8 Claims, 3 Drawing Sheets

PROCESS FOR FEEDING CATALYST TO FLUIDIZED BED FOR VAPOR PHASE POLYMERIZATION

This is a continuation of our earlier-filed U.S. patent application Ser. No. 07/842,094, filed Mar. 19th 1992, now U.S. Pat. No. 5,202,396.

TECHNICAL FIELD

This invention relates to a process for feeding catalyst in the polymerization of olefin using a vapor phase fluidized bed. More particularly, the invention relates to a process for avoiding the formation of polymer lumps by improving the structure of catalyst feeding lines, thereby enabling the continual feeding of a powdered catalyst.

BACKGROUND ART

The vapor phase polymerization of olefin using a fluidized bed apparatus as well known. For example, according to the disclosure in Japanese Laid-Open Patent Publication No. 47-13962, the following items are referred to as main factors in the fluidized bed vapor phase polymerization apparatus:

(I) to form a fluidized bed with polymer particles,
(II) to provide even distribution of olefin gas with a gas distribution plate,
(III) to fluidize the particles and remove the heat of polymerization with an olefin gas,
(IV) to cool a reactor with the circulation of a olefin gas using an external heat exchanger,
(V) to feed a solid catalyst into the reactor chamber,
(VI) to feed a catalyst promoter, and
(VII) to control the height of the fluidized bed and to remove polymer particles from the reaction chamber.

In addition, a vapor phase polymerization apparatus utilizing a stirred bed reactor is also well known (e.g., Japanese Patent Publication No. 59-21321).

When any type of the above-mentioned polymerization apparatus is used, the controlling of polymerization reaction is an important factor in practical operation. This is usually done by regulating the rate of feeding of a catalyst. However, the conventional olefin polymerization process is carried out under a pressure higher than ordinary pressure and the conventional catalyst employed is in the form of powder. It is difficult, in the conventional practice to continually feed predetermined quantities of solid catalyst powder in small doses.

In order to solve the above problem, Japanese Patent Publication No. 49-17426, discloses a method by which is a catalyst is fed into a fluidized bed reactor through four steps of subdividing, intercepting, exposing and flashing the catalyst by the combination of alternatively opening and closing of a catalyst feed line. Furthermore, catalyst feeding apparatus substantially based on the above method are disclosed in Japanese Patent Publication Nos. 52-45750 and 53-8666.

When a highly active catalyst in a lumpy state is fed into a reactor, polymerization is initiated before catalyst particles become well dispersed. This is not desirable because the polymer particles that are melted by the heat of polymerization are liable to gather into lumps. The highly active catalysts developed in recent years are liable to cause problems of this kind. Accordingly, a process to feed a catalyst in a lump form must be avoided if possible. It is preferable that a weighed catalyst be fed continually in small doses. In such a case, however, when the amount of each feed is too small, even though the formation of lumps is reduced, the number of complicated valve operation to regulate a catalyst feed increases, undesirably increasing the number of man-hours. In other words, in industrial operations, it is required that each dose of a catalyst is large to some extent.

In view of the above-described requirement, the object of the present invention is to provide a process for continually feeding a catalyst in small doses in a dispersed state without difficulty in a vapor phase polymerization process employing a fluidized bed reactor.

DISCLOSURE OF INVENTION

In view of the above-described object, the inventors of the present application have carried out extensive investigations and, as a result, it was found out that a catalyst can easily be fed smoothly in a dispersed state by reducing the cross-sectional area of a catalyst feed pipe in its midway.

In other words, the present invention provides a process for feeding a catalyst which is characterized in that, in the vapor phase polymerization of olefin using a fluidized bed reactor, the cross-sectional area of a catalyst feeding pipe is reduced in its midway when a powder catalyst is fed intermittently into a high pressure reactor by using a gas.

The present invention will be described in more detail in the following.

Figure 1:
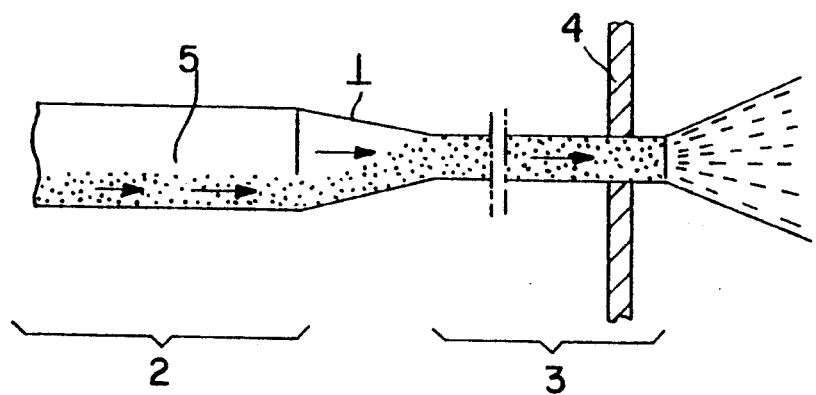
FIG. 1 is a schematic cross-sectional view of an embodiment of the catalyst feeding pipe according to the present invention.

The catalyst used in the process of the present invention are highly active olefin polymerization catalysts, that are exemplified by conventionally known catalysts such as Ziegler catalyst and Philips catalyst. The catalysts are powdered with average particle sizes in the range of 10 to 200 μm. An embodiment of a catalyst feeding pipe used in the present invention is shown in FIG. 1. The catalyst feeding pipe 1 comprises a fore pipe 2 of a larger diameter and a rear pipe 3 of a smaller diameter. The open end portion of the rear pipe 3 is passed through the wall 4 of a reactor and open into the interior of the reactor. In the first place, a predetermined quantity of a catalyst 5 is weighed and fed into the fore pipe 2. The inner diameter of the fore pipe 2 is comparatively large because the quantity of the catalyst must be large to some extent as described above. The catalyst particles 5 fed into the fore pipe 2 are transferred (in the direction of arrows) into the rear pipe 3 by the flow of an inert gas from the foremost to the rearmost side. By this process the velocity of the catalyst particles is increased and the catalyst particles are continuously passed into the reactor together with the flowing gas. In other words, the particles of catalyst 5 move slowly along the lower inside face of the pipe 2 because the velocity of gas flow is low. In order to make this movement smooth, the fore pipe 2 can be slightly inclined. The inner diameter of the rear pipe 3 is made small in order to accelerate the flow of gas and improve the dispersion of the catalyst particle 5. However, it is not desirable that the diameter of the pipe 3 be too small, because the velocity of gas will be too high and head loss will occur. Meanwhile, in order to prevent the tip end of the rear pipe 3 from being blocked by polymer particles, it is desirable to controllably supply pipe 3 with an inert gas. For this reason, and in order to avoid the lowering of partial pressure of an olefin in the reactor due to the supply of inert gas, the inner diameter of pipe 3 is desirably made small to reduce the rate of gas flow.

The velocity of gas flow in the rear pipe 3 is determined according to the following factors:

Δp . . . Pressure difference between a gas reservoir tank and a reactor
v . . . Volume of the gas reservoir tank
d . . . Inner diameter of the rear pipe 3
l . . . Length of the rear pipe 3

In the above factors, the value of $\Delta p \times v$ is the driving force of the feed of a catalyst. When this value is too large, however, an excessive amount of the inert gas are introduced into the reactor, which reduces the partial pressure of olefin and lowers the rate of reaction. Accordingly, the value of $\Delta p \times v$ is naturally limited. Furthermore, because the values of d and l determine the resistance to gas flow, they have a direct influence upon the Δp. In view of these relationships among these, the values of the above factors may be set in the following ranges.

Δp: 0.5–10 kg/cm², preferably 1–5 kg/cm²
v: 1–100 liter, preferably 3–20 liter
d: 3–10 mmϕ, preferably 4–8 mmϕ
l: preferably short, more preferably 1–10 m.

A suitable inner diameter of fore pipe 2 is 5–30 mmϕ preferably 10–25 mmϕ because it receives more than a certain amount of a weighed catalyst. When the inner diameter of the fore pipe 2 is less than 5 mmϕ, the quantity of catalyst feed is too small, which increases the repetition of feeding catalyst, which is accompanied by troublesome operation. On the other hand, it is not desirable that the inner diameter be more than 30 mmϕ, because the continuous flashing of the catalyst particles is difficult even when the inner diameter of the rear pipe 3 is adjusted.

In view of the flowing condition of catalyst particles, the gas velocity catalyst feeding pipe 1 is in the range of 3–10 m/sec; preferably 4–8 m/sec in fore pipe 2; and 10–60 m/sec, preferably 15–50 m/sec, in rear pipe 3. The state of flow in the transferring of particles with a gas flow is described on page 269 of *Bulk Handling Technique of Powdery Particles*, edited by Nippon Huntai Kogyo Gijutu Kyokai, published by Nikkan Kogyo Shimbunsha.

Under the above conditions, it is further necessary that the ratio in cross-sectional areas of rear pipe 3 to fore pipe 2 be in the range of 5–50%. When the ratio of cross-sectional area is less than 5%, the catalyst feeding pipe 1 is liable to be blocked. On the other hand, when the ratio of cross-sectional area is more than 50%, catalyst is fed into the reactor in the state of lumps the which is not desirable because polymer blocks are liable to be formed.

Furthermore, it is desirable that the cross-sectional area of the boundary portion between fore pipe 2 and rear pipe 3 of catalyst feeding pipe 1 is gradually reduced. For example, both the members are connected with a reducing joint.

In the following, a process for feeding a catalyst into a fluidized bed reactor is described with reference to FIGS. 2 and 3. In the figures the numeral 6 denotes a catalyst reservoir tank and 7, an inert gas reservoir tank.

Figure 2:
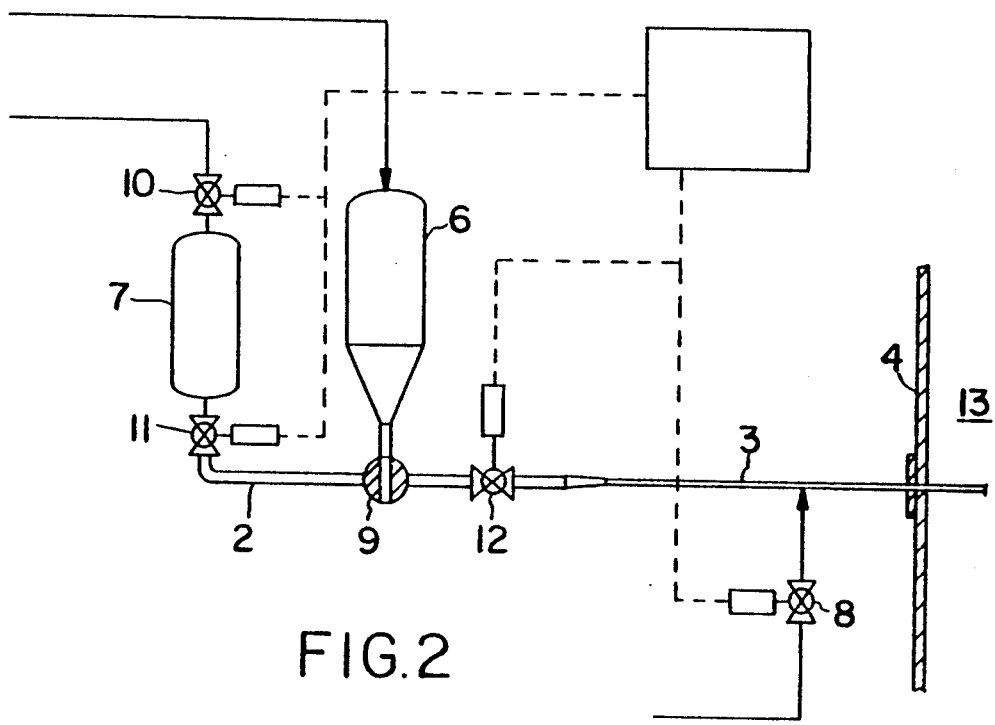
FIG. 2 and FIG. 3 are explanatory illustrations of catalyst feeding devices.

Before a catalyst is fed, only valve shown 8 among automatic ball valves in FIG. 2 is opened the other valves are closed. Catalyst measuring valve 9 is opened in the horizontal direction. In the catalyst feeding operation started from this state, valve 10 is opened to allow inert gas to fill up inert gas reservoir tank 7, and once filled, the valve is closed. Catalyst measuring valve 9 is next opened in the vertical direction to allow catalyst to flow down from catalyst reservoir tank 6 into fore pipe 2. Valve 11 is next opened, valve 8 is closed and valve 12 is opened after that. By opening catalyst measuring pipe 9, a predetermined quantity of catalyst held in fore pipe 2 is flashed into reactor 13 by way of rear pipe 3 owing to the force of gas flowing from inert gas reservoir tank 7. After the feeding of the catalyst, valve 12 is closed, valve 8 is opened, and valve 11 is closed returning the system to its initial state.

Figure 3:
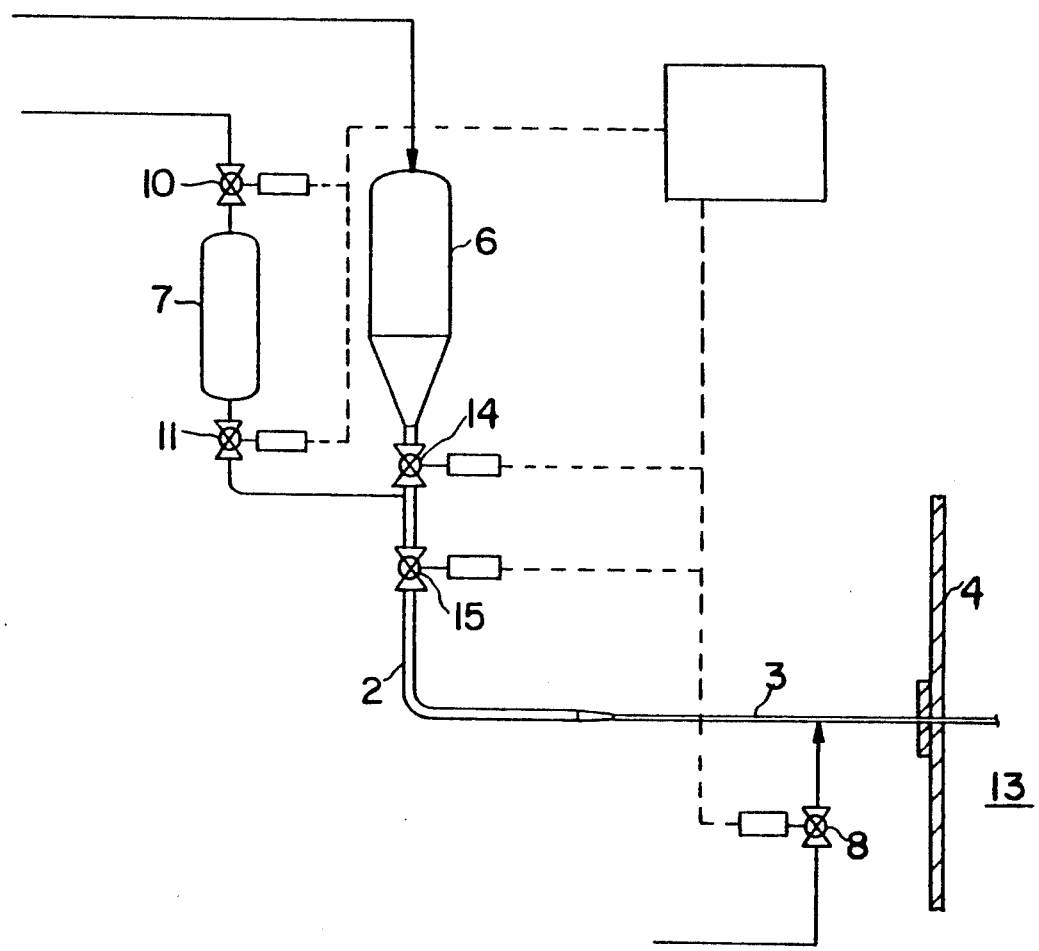

In FIG. 3, only valve 8 is opened all other valves are closed in the state before the feeding of the catalyst, such as shown in the embodiment of FIG. 2. When a catalyst is fed, inert gas reservoir tank 7 is filled with an inert gas by opening and then closing valve 10. Valve 14 is then opened and closed to introduce a portion of the catalyst into the space between valves 14 and 15. Valve 11 is then opened, and valve 8 is closed. After that, by opening valve 15, the subdivided catalyst is flashed into reactor 13 through the fore pipe 2 and the rear pipe 3 by the gas flow. Afterwards valve 15 is closed, valve 8 is opened and valve 11 is closed to return the system to its initial state.

In the above-described two embodiments, it is desirable that the diameter of catalyst measuring valve 9 in FIG. 2, and that of the measuring portion between valves 14 and 15 in FIG. 3, are sufficiently large to allow the catalyst powder to drop. That is, as fore pipe 2, the inner diameter of these may be 5 to 30 mmϕ, preferably 10 to 25 mmϕ.

BEST MODE FOR CARRYING OUT THE INVENTION

The present invention is described in the following with reference to examples and comparative examples. It is to be noted that the present invention is not restricted to them.

EXAMPLE 1

Figure 4:
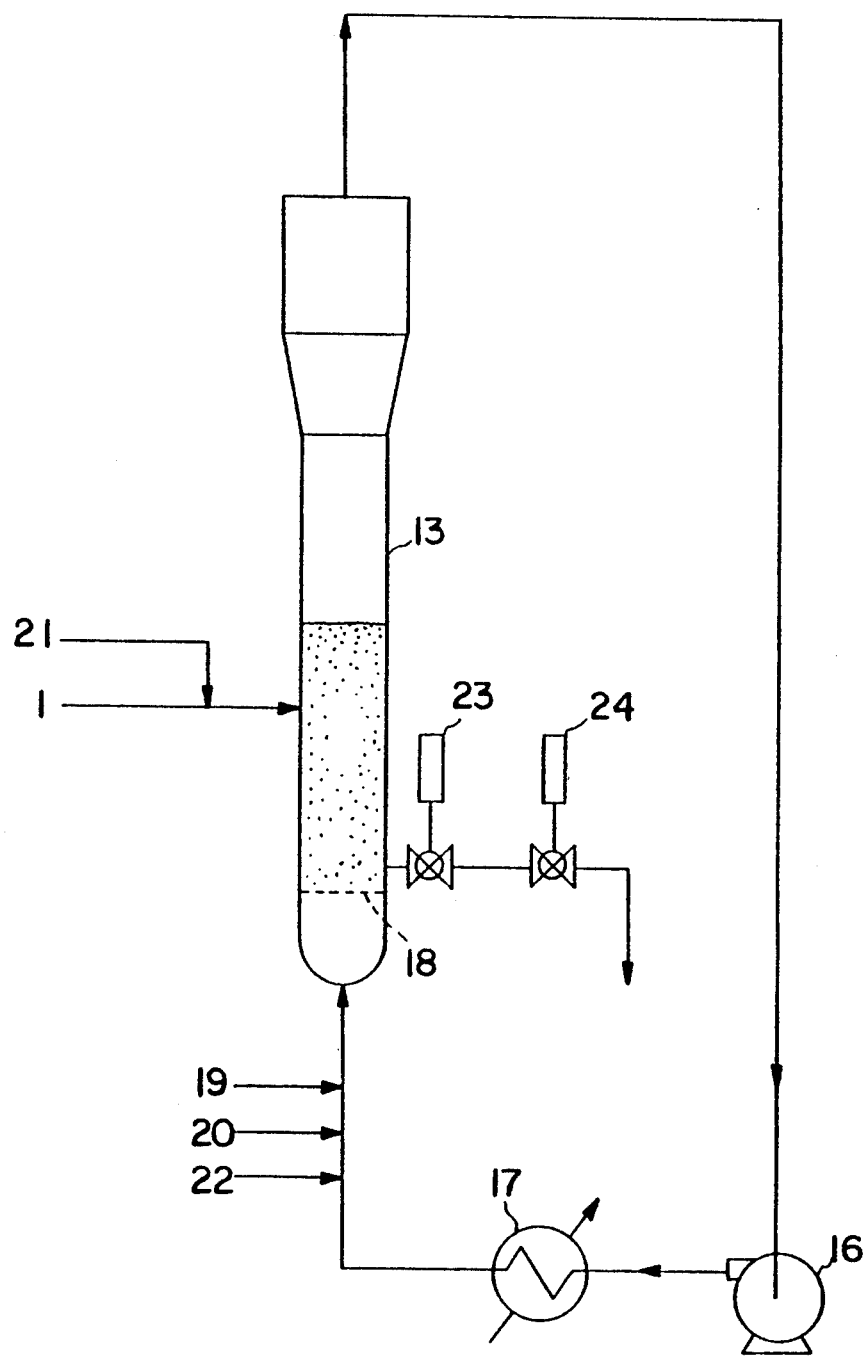
FIG. 4 is an explanatory illustration of a reaction apparatus of the fluidized bed type.

A fluidized bed reactor 13 as shown in FIG. 4 was used in this example. Gas was circulated through a loop comprising blower 16, cooler 17, and flow regulator (not shown). The gas which was introduced into reactor 13 was evenly distributed by distribution plate 18.

Initially the powder of previously dried linear low density polyethylene was fed into a reactor, and the temperature in reactor 13 was maintained at 85° C. by circulating a gas with blower 16. By adjusting the ratios in the gas phase of hydrogen/ethylene (molar ratio) to 10, and 1-butene/ethylene to 40, hydrogen was fed through line 19, and a mixture of 1-butene and ethylene was fed through line 20. Nitrogen gas was fed from line 21 to control the nitrogen concentration at 35 mole %. The total pressure was maintained at 20 kg/cm²·G.

The polymerization reaction was started by feeding a solution of triethylaluminum in hexane as a catalyst promoter through pipe 22 and a highly active solid catalyst through catalyst feeding pipe 1. In the catalyst, Ti, Mg and Al were carried on a silica carrier.

The feeding of the solid catalyst was carried out using a device shown in FIG. 2. The inner diameters of valves 9 and 12 and fore pipe 2 were 10 mm, and the inner diameter of rear pipe 3 was 4 mm (ratio in cross-sectional areas: 16%). A reducing joint of 10 mm in length was used for the diameter-reduced portion from the 10 mm$\phi$ end to the 4 mm$\phi$ end. With the formation of polymer particles of ethylene.1-butene copolymer, the produced particles were removed from the reaction system through ball valves 23 and 24. The polymer product obtained was 0.95 g/10 min. in MFR, and 0.9204 g/cm$^3$ in density, and white freely flowing particles.

The operation could be continued without any trouble and the reaction was stopped after 33 days. The condition in the reactor was examined, however, it was clear without any lumpy polymer product.

EXAMPLE 2

Using an apparatus such as that used in Example 1, preparation of ethylene.1-butene copolymer was carried out in a like method and conditions. The apparatus shown in FIG. 2 was used as in Example 1 for feeding the catalyst, the inner diameters of valves 9 and 12 and fore pipe 2 were all 10 mm; in addition, the inner diameter of the rear pipe 3 was also 10 mm. By ratio in cross-sectional areas: 100%.

About 4 hours after the start of polymerization, lumpy polymer balls of 10 to 15 mm in diameter were found in the polymer particles. Since the number of these balls increased with the passage of time, the operation was stopped after 48 hours. When the inside of the reactor was examined a large quantity of lumpy polymer balls was observed. The color of a cross section of this lumpy polymer was dark gray and contained much catalyst.

From the above results, it was understood that when the cross-sectional area of the catalyst feeding pipe is not reduced in the midway, the dispersion of the catalyst particles was insufficient and the melting of polymer particles occur red in the reactor.

EXAMPLE 3

Using an apparatus such as that used in Example 1, preparation of ethylene.1-butene copolymer was carried out in a like method and conditions. The apparatus shown in FIG. 2 was used as in Example 1 for feeding the catalyst. The inner diameters of valves 9 and 12, and fore pipe 2 were all 10 mm. However, the inner diameter of the rear pipe 3 was 2 mm (ratio in cross-sectional areas: 4%). A reducing joint was used for the portion between them.

In this Example, the reaction was not stable after the start of polymerization. In addition, the feed of the catalyst became impossible after 5 hours from the start of polymerization, so that the operation was stopped. When the inside of the reactor was examined, fore pipe 2 was blocked.

As described above, it was understood that, when the rate of reduction of cross-sectional areas is to high, the smooth and continual flashing of a catalyst is hardly carried out.

INDUSTRIAL APPLICABILITY

In the polymerization of olefin was a gas phase fluidized bed, the continual feed of a powder catalyst in small doses can be done without difficulty by reducing midway the cross section of a catalyst feeding pipe. As a result, the operation can be continued for a long time by avoiding the formation of lumps of polymer.

We claim:

1. In a process for the vapor phase fluidized bed polymerization of olefins which comprises providing a particulate catalyst to a polymerization reaction chamber, providing an olefin and polymerization reactants to said chamber, and causing said olefin, reactants and catalyst to bring about a polymerization reaction, the improvement of which comprises providing a particulate catalyst to the reaction chamber through a catalyst feed pipe having a first portion of a first inner diameter, a second portion of a second inner diameter less than that of the first inner diameter, and a third portion between said first and second portions having an inner diameter which is reduced along its length from said first to said second inner diameter.

2. A process according to claim 1 wherein the cross sectional area ratio of said second inner diameter is from 5 to 50% of that of the first inner diameter.

3. A process according to claim 1 wherein the first inner diameter is from 5 to 30 mm$\phi$.

4. A process according to claim 3 wherein the first inner diameter is from 10 to 25 mm$\phi$.

5. A process according to claim 1 which comprises providing a particulate catalyst to a polymerization reaction chamber by adding said catalyst to a gas flowing through the catalyst feed pipe at a gas velocity of about 3 to about 10 m/sec. in the first portion of the feed pipe, and a gas velocity of about 10 to about 60 m/sec. in the second portion of the feed pipe.

6. A process according to claim 1 wherein the catalyst is a silica carrier carrying a titanium, magnesium and aluminum polymerization catalyst, and wherein the olefin reactants are butene and ethylene.

7. A process according to claim 6 wherein a catalyst promoter is also added to the reaction chamber.

8. A process according to claim 7 wherein the promoter is a solution of triethylaluminum in hexane.

* * * * *